US011354731B2

(12) United States Patent
Gomi et al.

(10) Patent No.: US 11,354,731 B2
(45) Date of Patent: Jun. 7, 2022

(54) VEHICLE RENTAL SYSTEM AND VEHICLE RENTAL METHOD

(71) Applicant: HONDA MOTOR CO., LTD., Tokyo (JP)

(72) Inventors: Tetsuya Gomi, Wako (JP); Ryouichi Shimano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/939,970

(22) Filed: Jul. 27, 2020

(65) Prior Publication Data

US 2021/0035201 A1    Feb. 4, 2021

(30) Foreign Application Priority Data

Jul. 30, 2019   (JP) .............................. JP2019-139526

(51) Int. Cl.

| G06Q 50/30 | (2012.01) |
|---|---|
| G06Q 10/02 | (2012.01) |
| G06Q 30/06 | (2012.01) |
| G01P 13/00 | (2006.01) |
| G06Q 30/00 | (2012.01) |
| G06Q 30/02 | (2012.01) |
| G08G 1/14 | (2006.01) |

(Continued)

(52) U.S. Cl.
CPC .......... *G06Q 30/0645* (2013.01); *G01P 13/00* (2013.01); *G06Q 10/02* (2013.01); *G06Q 30/0185* (2013.01); *G06Q 30/0284* (2013.01); *G06Q 50/30* (2013.01); *G07B 15/06* (2013.01); *G08G 1/146* (2013.01); *H04N 7/183* (2013.01); *G01S 19/01* (2013.01); *G06Q 2240/00* (2013.01)

(58) Field of Classification Search
CPC .... G07B 15/06; G06Q 10/02; G06Q 30/0645; G06Q 50/30; G06Q 30/0284
See application file for complete search history.

(56) References Cited

U.S. PATENT DOCUMENTS 5,231,392 A *  7/1993  Gust ...................... E04H 6/426
                                                                 116/28 R
9,639,994 B2 *  5/2017  Beaurepaire ........... G07B 15/02
(Continued)

FOREIGN PATENT DOCUMENTS

| CN | 108416933 A | 8/2018 |
|---|---|---|
| JP | 2017-016450 | 1/2017 |

OTHER PUBLICATIONS

Detection Perfection—Accuracy is the Name of the Game, Nwave. io, https://www.nwave.io/detection-perfection-accuracy-is-the-name-of-the-game/, Jun. 6, 2018 (Year: 2018).*

*Primary Examiner* — Emmett K. Walsh
*Assistant Examiner* — Michelle E Carey
(74) *Attorney, Agent, or Firm* — Rankin, Hill & Clark LLP

(57) ABSTRACT

A vehicle rental system includes a processor that determines whether a parked vehicle in a standby parking space is a rental vehicle or an owned vehicle of a user on the basis of parked vehicle identification information, rental vehicle identification information, and owned vehicle identification information, and the processor executes wrong parking handling processing for removing the parked vehicle in the standby parking space when the processor determines that the parked vehicle in the standby parking space is not the rental vehicle or the owned vehicle within a rental vehicle usage scheduled period.

5 Claims, 11 Drawing Sheets

(51) Int. Cl.
*H04N 7/18* (2006.01)
*G07B 15/06* (2011.01)
*G01S 19/01* (2010.01)

(56) References Cited

U.S. PATENT DOCUMENTS

| | | | | |
|---|---|---|---|---|
| 2012/0095812 | A1* | 4/2012 | Stefik | G06Q 50/30 |
| | | | | 705/13 |
| 2015/0170445 | A1* | 6/2015 | Bajekal | G07C 9/28 |
| | | | | 340/5.61 |
| 2015/0348179 | A1* | 12/2015 | Kamisawa | G06Q 10/02 |
| | | | | 705/5 |
| 2016/0163119 | A1* | 6/2016 | Bashani | G07B 15/02 |
| | | | | 705/13 |
| 2016/0240083 | A1* | 8/2016 | Chinomi | G08G 1/144 |
| 2020/0111268 | A1* | 4/2020 | Montague | G01C 21/3697 |

\* cited by examiner

FIG.4
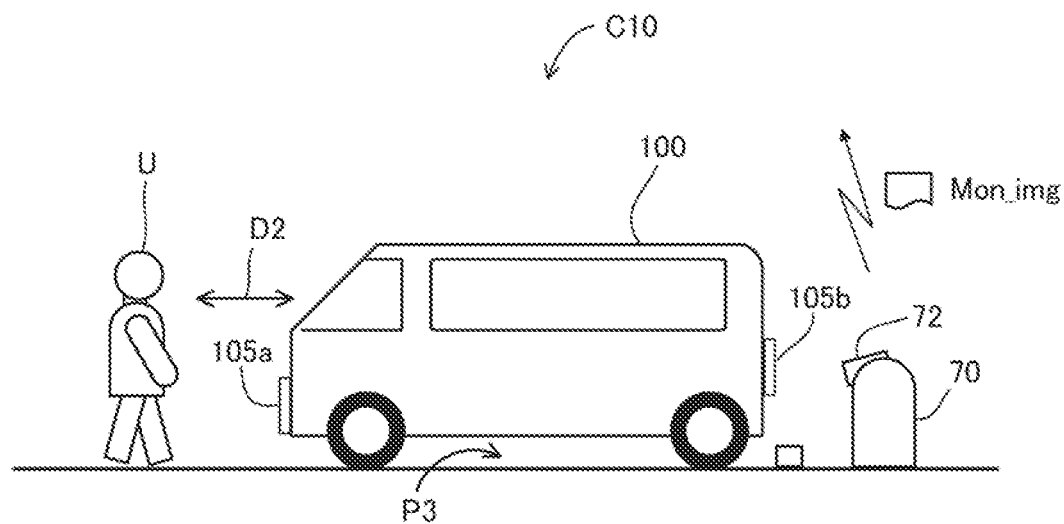
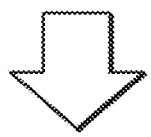
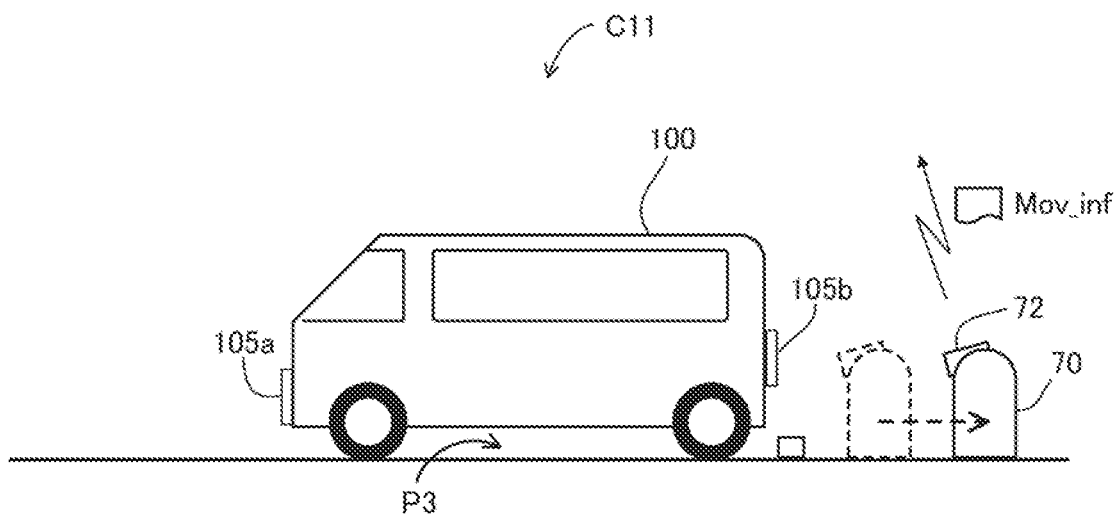

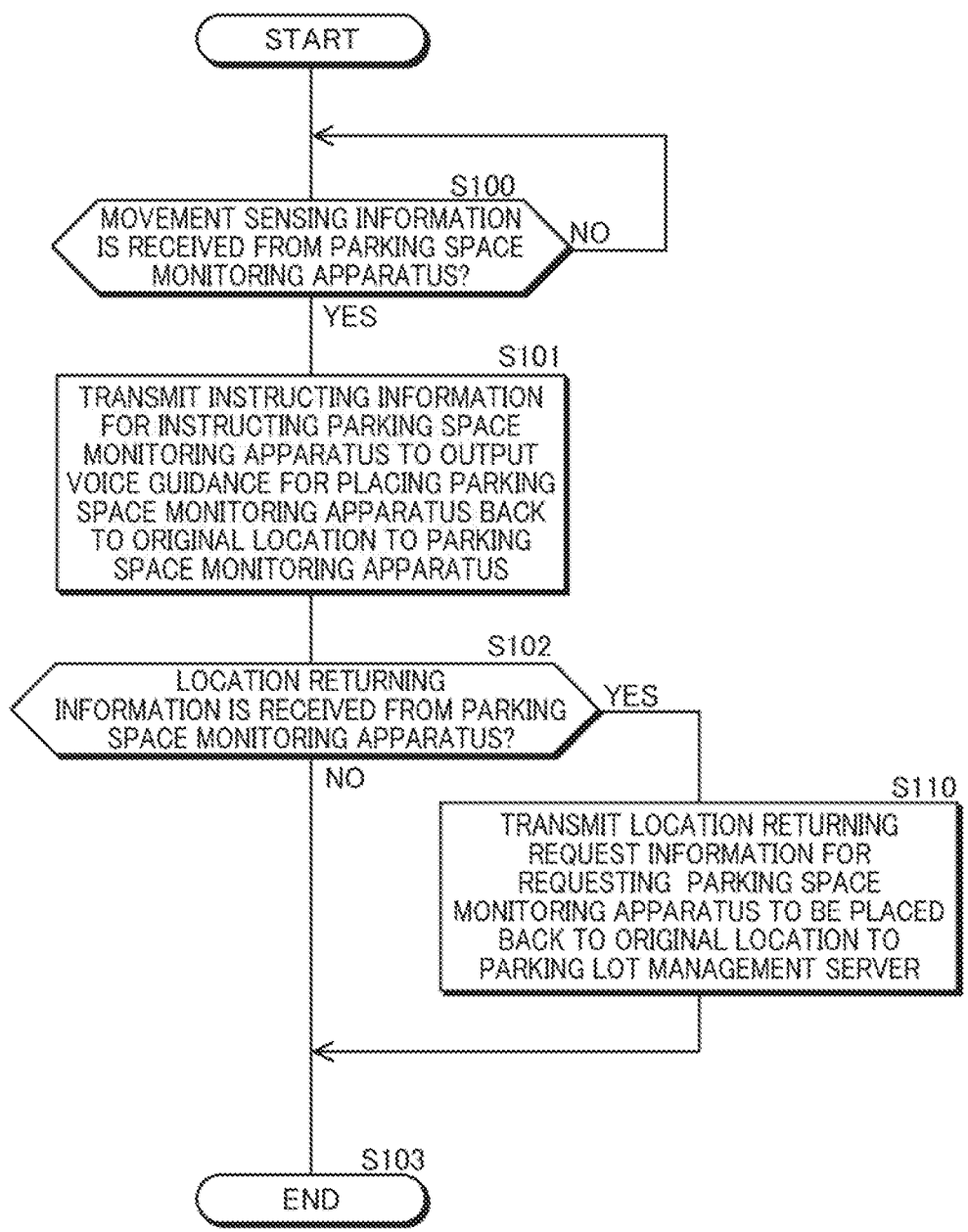

VEHICLE RENTAL SYSTEM AND VEHICLE RENTAL METHOD

INCORPORATION BY REFERENCE

The present application claims priority under 35 U.S.C. § 119 to Japanese Patent Application No. 2019-139526 filed on Jul. 30, 2019. The content of the application is incorporated herein by reference in its entirety.

BACKGROUND OF THE INVENTION

Field of the Invention

The present invention relates to a vehicle rental system and a vehicle rental method.

Description of the Related Art

Hitherto, a vehicle rental system that manages rental and returning of a rental vehicle by car sharing and the like and performs reservation and registration of the rental vehicle in accordance with reservation application information transmitted from a user terminal has been proposed (for example, see Japanese Patent Laid-Open No. 2017-16450).

In the vehicle rental system, the reserved rental vehicle acquires authentication information of a user when the user holds a registration card over a card reader provided on the rental vehicle. When the authentication information of the user is transmitted to a management server from the rental vehicle and reservation of the user is authenticated, a usage permission notification is transmitted to the rental vehicle from the management server and the rental vehicle is unlocked. As a result, the user can use the rental vehicle.

As a usage aspect of the rental vehicle by the user, a usage aspect in which a user that does not own a vehicle comes to a parking place of the rental vehicle on foot and starts using the rental vehicle is common. However, as described below, a user owning a vehicle may use the rental vehicle. In other words, the user owning a vehicle may use a vehicle with a high riding capacity such as a minivan, a special-specification vehicle such as a welfare vehicle, a vehicle for a particular interest such as a sports car, and the like as a rental vehicle of which type is different from that of the owned vehicle.

As described above, when the user owning a vehicle rents a rental vehicle, a case where the user comes to the parking place of the rental vehicle by the owned vehicle, replaces the rental vehicle with the owned vehicle, and starts using the rental vehicle is supposed. In this case, the rental vehicle is used in a state in which the owned vehicle of the user is parked in a place where the rental vehicle had been parked.

As described above, the inventors of this application have found that inconveniences as below, for example, may occur when a rental form in which the user uses the rental vehicle by replacing the rental vehicle with the owned vehicle is supposed.

Inconvenience 1 . . . When the user comes to the parking place of the rental vehicle on foot, the vehicles are not replaced with each other, and the parking place of the rental vehicle is empty while the rental vehicle is used. When a person other than the user parks a vehicle in the empty parking place, the user cannot return the rental vehicle when the user comes back to the parking place by the rental vehicle.

Inconvenience 2 . . . The following case is conceived. A user that has come to the parking place of the rental vehicle with the owned vehicle replaces the rental vehicle with the owned vehicle and starts using the rental vehicle. The user that has come to return the rental vehicle replaces the owned vehicle with the rental vehicle and places the rental vehicle back to the original parking place. Then, the user parks the owned vehicle in a nearby empty parking space. In this case, when the parking space in which the user parks the owned vehicle is a parking space under contract of another person, the other person cannot park a vehicle.

Inconvenience 3 . . . The following case is conceived. A general pay parking space and the parking space for the rental vehicle are placed side by side in a parking lot, and the user that has come to return the rental vehicle fails to replace the owned vehicle with the rental vehicle and parks the rental vehicle in an empty general pay parking space other than the original parking place. In this case, other people cannot use the pay parking space.

The present invention has been made in view of the background as above, and an object thereof is to provide a vehicle rental system and a vehicle rental method capable of preventing inconveniences that may occur due to a rental form in which a user uses a rental vehicle by replacing the rental vehicle with an owned vehicle.

SUMMARY OF THE INVENTION

As a first aspect for achieving the abovementioned object, there can be given a vehicle rental system including: a processor that; recognizes a usage scheduled period of a rental vehicle; recognizes owned vehicle identification information for identifying an owned vehicle of a user of the rental vehicle in the usage scheduled period; recognizes rental vehicle identification information for identifying the rental vehicle; recognizes parked vehicle identification information for identifying a parked vehicle in a standby parking space that is a parking space during rental standby for the rental vehicle; determines whether the parked vehicle in the standby parking space is the rental vehicle or the owned vehicle on the basis of the parked vehicle identification information, the rental vehicle identification information, and the owned vehicle identification information; and executes wrong parking handling processing for removing the parked vehicle in the standby parking space when the processor determines that the parked vehicle in the standby parking space is not the rental vehicle or the owned vehicle within the usage scheduled period.

In the vehicle rental system, the processor may recognize a current location of the rental vehicle; and transmit information on an empty parking space other than the standby parking space to a user terminal used by the user when the processor determines that the parked vehicle in the standby parking space is not the owned vehicle when returning of the rental vehicle to the standby parking space is estimated in advance on the basis of the current location of the rental vehicle recognized by the processor.

In the vehicle rental system, the processor may execute the wrong parking handling processing when the processor determines that the parked vehicle in the standby parking space is the owned vehicle after the usage scheduled period elapses.

In the vehicle rental system, a parking space monitoring apparatus that is moveably arranged in the standby parking space including: a camera that photographs the standby parking space; and the other processor that transmits a photographed image obtained by the camera may be further included, and the processor may acquire the photographed image of the standby parking space transmitted from the parking space monitoring apparatus as the parked vehicle identification information.

In the vehicle rental system, the parking space monitoring apparatus may include a movement sensor that detects movement of the parking space monitoring apparatus; and the other processor may perform movement reporting when the movement sensor detects that the parking space monitoring apparatus is moved by an amount exceeding a predetermined movement threshold.

In the vehicle rental system, the standby parking space may be arranged to be placed side by side with a pay parking space in a parking lot, and the processor may recognize exiting vehicle identification information for identifying an exiting vehicle that arrives at an exit of the parking lot and determine, when the processor recognizes the exiting vehicle identification information for a predetermined exiting vehicle that reaches the exit within the usage scheduled period, whether the predetermined exiting vehicle is the owned vehicle on the basis of the owned vehicle identification information and may reduce a charge of usage fee of the parking lot for the user when the predetermined exiting vehicle is the owned vehicle and the processor determines that the parked vehicle in the standby parking space is the owned vehicle within the usage scheduled period.

Next, as a second aspect for achieving the abovementioned object, there can be given a vehicle rental method executed by a computer system. The vehicle rental method includes: recognizing a usage scheduled period of a rental vehicle; recognizing owned vehicle identification information for identifying an owned vehicle of a user of the rental vehicle in the usage scheduled period; recognizing rental vehicle identification information for identifying the rental vehicle; recognizing parked vehicle identification information for identifying a parked vehicle in a standby parking space that is a parking space during rental standby for the rental vehicle; determining whether the parked vehicle in the standby parking space is the rental vehicle or the owned vehicle on the basis of the parked vehicle identification information, the rental vehicle identification information, and the owned vehicle identification information; and executing wrong parking handling processing for removing the parked vehicle in the standby parking space when it is determined that the parked vehicle in the standby parking space is not the rental vehicle or the owned vehicle within the usage scheduled period.

According to the vehicle rental system of the present invention, the processor determines whether the parked vehicle in the standby parking space of the rental vehicle is the owned vehicle of the user or the rental vehicle. When the parked vehicle in the standby parking space is not the owned vehicle of the user or the rental vehicle during the usage scheduled period of the rental vehicle, the processor executes the wrong parking handling processing and the parked vehicle is removed. As a result, the inconveniences that may occur due to a rental form in which the user uses the rental vehicle by replacing the rental vehicle with the owned vehicle can be prevented.

BRIEF DESCRIPTION OF THE DRAWINGS

FIG. 4 is an explanatory diagram of how a rental vehicle of an embodiment of the present invention is placed in and out;
FIG. 11 is a flowchart of movement handling processing of the parking space monitoring apparatus.

DETAILED DESCRIPTION OF THE PREFERRED EMBODIMENTS

1. Rental Service of Vehicle

An aspect of a rental service of a vehicle in an embodiment of the present invention is described with reference to FIG. 1. Rental vehicles 100 and 110 are rented out by car sharing, for example, and are parked in a parking lot PL including a mechanical entrance gate Pent and a mechanical exit gate Pext. In the parking lot PL, parking spaces P1 to P7 for seven cars are provided.

The parking spaces P1 and P2 are arranged in a monthly parking area Mar, and the parking spaces P3 and P4 are standby parking spaces for the rental vehicles 100 and 110. The parking spaces P5 to P7 are pay-by-the-hour parking spaces. As described above, in the parking lot PL, the monthly parking spaces P1 and P2, the standby parking spaces P3 and P4 for the rental vehicles 100 and 110, and the pay-by-the-hour parking spaces P5, P6, and P7 are placed side by side. The pay-by-the-hour parking spaces P5, P6, and P7 are denoted by numerals "01", "02", and "03".

The rental of the rental vehicles 100 and 110 are managed by a vehicle rental system 1. A user U that desires to use a vehicle by car sharing downloads a reservation app (application program) for car sharing provided by the vehicle rental system 1 on a user terminal 80. Examples of the user terminal 80 are a smartphone, a mobile phone, and a tablet computer. The user U selects a car type, equipment, a usage desired period, and the like of the rental vehicle and reserves the usage of the rental vehicle by executing the reservation app by the user terminal 80.

Figure 1:
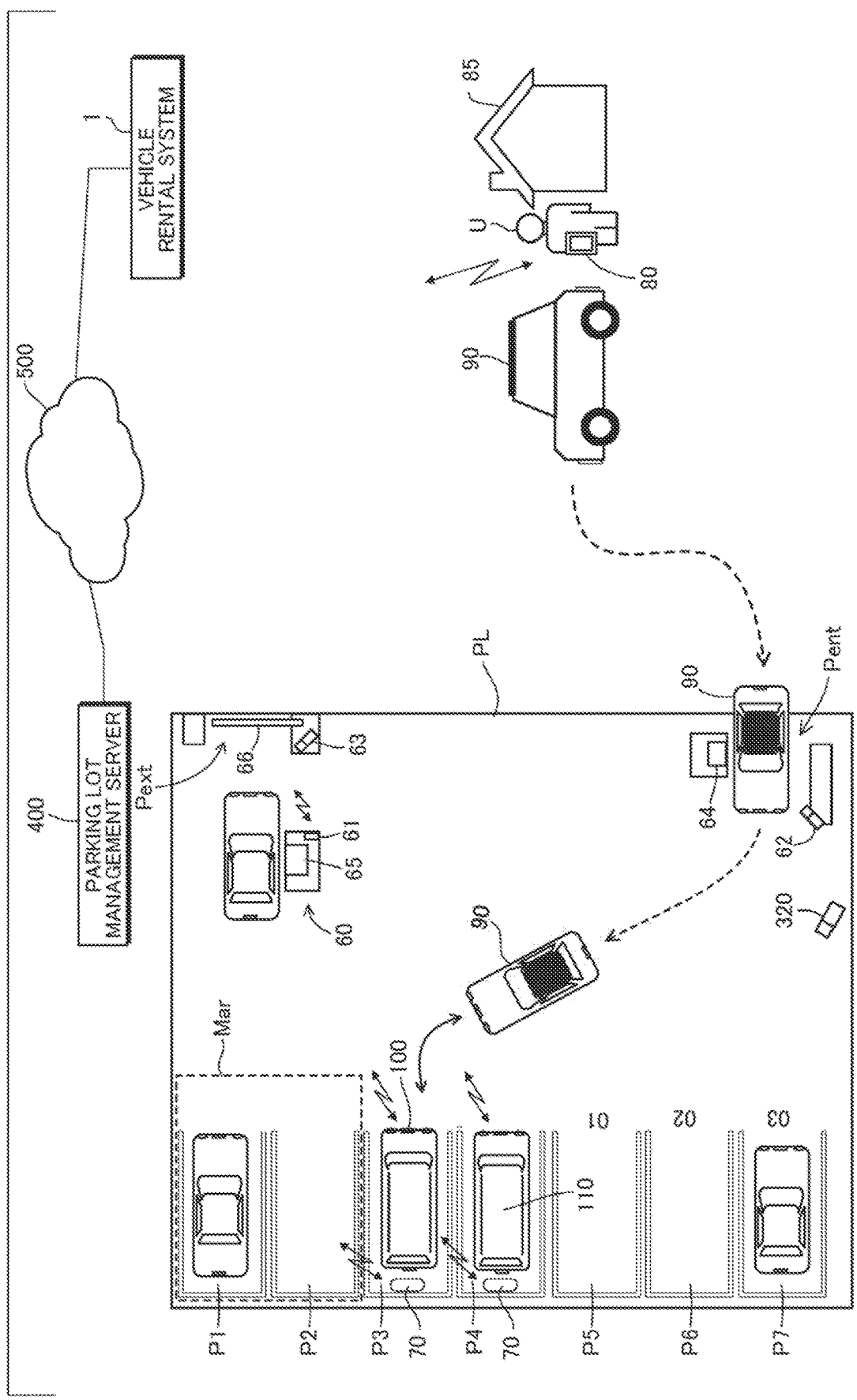
FIG. 1 is an explanatory diagram of an aspect of a rental service of a vehicle.

FIG. 1 illustrates a case where the user U reserves the usage of the rental vehicle 100. The user U owns a vehicle 90 at home 85. The vehicle 90 is hereinafter also referred to as the owned vehicle 90. The user U can receive the rental vehicle 100 by coming to the parking lot PL on foot, but a case where the user U receives the rental vehicle 100 by coming to the parking lot PL by the owned vehicle 90 is illustrated in FIG. 1.

When the user U receives the rental vehicle 100 by coming to the parking lot PL by the owned vehicle 90, the user U is obligated to replace the rental vehicle 100 with the owned vehicle 90 and park the owned vehicle 90 in the standby parking space P3. When the user U returns the rental vehicle 100, the user U is obligated to replace the owned vehicle 90 with the rental vehicle 100 and place the rental vehicle 100 back to the standby parking space P3.

When the user U neglects those obligations and parks the owned vehicle 90 or the rental vehicle 100 in the empty monthly parking space P2 without replacing the rental vehicle 100 with the owned vehicle 90, there is an inconvenience in which a contractor of the monthly parking space P2 cannot park in the monthly parking space P2. When the pay-by-the-hour parking space P5 is empty and the user U parks the owned vehicle 90 or the rental vehicle 100 in the pay-by-the-hour parking space P5, there is an inconvenience in which a person desiring to park that desires to use the pay-by-the-hour parking space P5 cannot park.

When the user U comes to the parking lot PL on foot and starts using the rental vehicle 100 and the standby parking space P3 is empty, another vehicle may be parked in the standby parking space P3. In this case, there is an inconvenience in which the user U that has come back to the parking lot PL in order to return the rental vehicle 100 cannot place the rental vehicle 100 back to the standby parking space P3.

Thus, a parking space monitoring apparatus 70 is moveably arranged in the standby parking space P3 in order to monitor the vehicle parked in the standby parking space P3. The parking space monitoring apparatus 70 is formed by a CPU (corresponding to the other processor of the present invention), a memory, a communication unit (receiver/transmitter), and the like. The parking space monitoring apparatus 70 communicates with the vehicle rental system 1 over a communication network 500, and transmits a photographed image of the standby parking space P3 to the vehicle rental system 1. The vehicle rental system 1 monitors the vehicle parked in the standby parking space P3, and executes wrong parking handling processing for removing vehicles wrongly parked in the standby parking space P3 on the basis of the photographed image of the standby parking space P3 transmitted from the parking space monitoring apparatus 70.

Similarly, the parking space monitoring apparatus 70 is also arranged in the standby parking space P4. The vehicle rental system 1 monitors the vehicle parked in the standby parking space P4 and executes wrong parking handling processing for removing vehicles wrongly parked in the standby parking space P4 on the basis of a photographed image of the standby parking space P4 transmitted from the parking space monitoring apparatus 70.

In the parking lot PL, a gate management apparatus 60 that manages vehicles that come into and out of the parking lot PL is installed. The gate management apparatus 60 includes a communication unit (receiver/transmitter) 61 that communicates with the vehicle rental system 1 and a parking lot management server 400 over the communication network 500, an entrance camera 62 that photographs vehicles entering the parking lot PL, and a ticket machine 64 that issues a parking ticket to an entering vehicle. The gate management apparatus 60 further includes an exit camera 63 that photographs vehicles exiting the parking lot PL, a fee adjustment machine 65 that collects the parking ticket and a parking fee, and a gate bar 66. The parking lot management server 400 is a computer system formed by a CPU, a memory, a communication unit (receiver/transmitter), and the like. The ticket machine 64 and the fee adjustment machine 65 are formed by a CPU, a memory, and the like.

The vehicle rental system 1 executes processing for discounting the parking fee for the user U that has entered the parking lot PL by the owned vehicle 90 in order to use the rental vehicle 100, and transmits parking fee setting information indicating the discounted fee to the gate management apparatus 60. The discounting of the parking fee includes making the parking fee free of charge. As a result, the burden of the parking fee on the user U that uses the rental vehicle 100 by replacing the rental vehicle 100 with the owned vehicle 90 can be reduced or removed.

2. Configurations of Parking Space Monitoring Apparatus, Gate Management Apparatus, Parking Lot Monitoring Apparatus, Rental Vehicle, and Owned Vehicle With reference to FIG. 2, FIG. 3, and FIG. 4, configurations of the parking space monitoring apparatus 70, the gate management apparatus 60, a parking lot monitoring apparatus 320, the rental vehicle 100, and the owned vehicle 90 are described.

Figure 2:
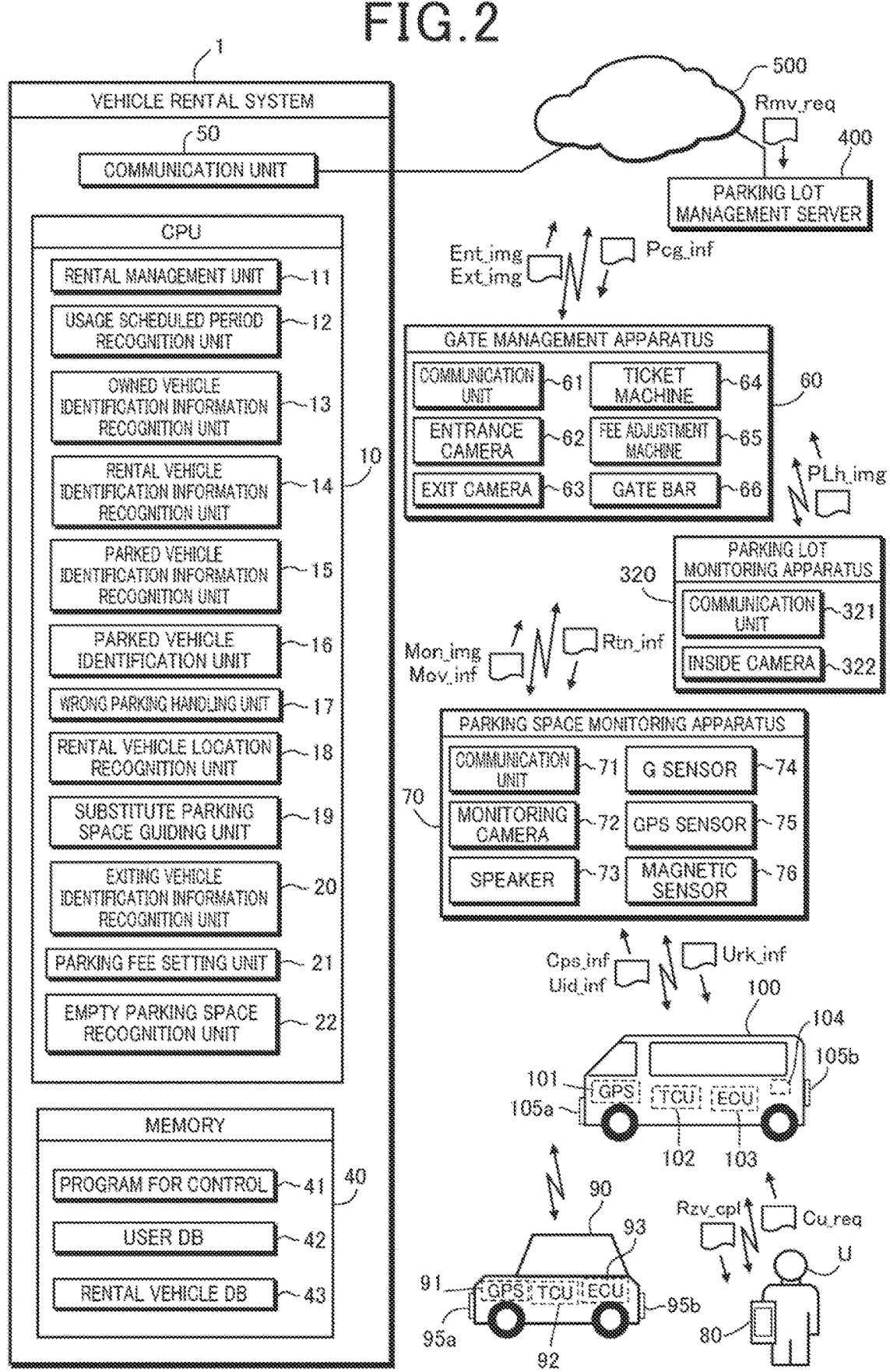
FIG. 2 is a configuration diagram of a vehicle rental system and a parking space monitoring apparatus.

As illustrated in FIG. 2, the parking space monitoring apparatus 70 includes a communication unit (receiver/transmitter) 71 for communicating with the vehicle rental system 1 over the communication network 500, a monitoring camera 72 that photographs the standby parking space P3 or P4, a speaker 73, a G sensor (acceleration sensor) 74, a global positioning system (GPS) sensor 75, and a magnetic sensor 76. The monitoring camera 72, the G sensor 74, the GPS sensor 75, and the magnetic sensor 76 correspond to a movement sensor of the present invention.

The parking lot monitoring apparatus 320 is formed by a CPU, a memory, and the like. The parking lot monitoring apparatus 320 includes an inside camera 322 that photographs the entire parking lot PL, and a communication unit (receiver/transmitter) 321 for communicating with the vehicle rental system 1, the parking lot management server 400, the parking space monitoring apparatus 70, and the like over the communication network 500.

The parking space monitoring apparatus 70 detects that the parking space monitoring apparatus 70 has left an arranged location by any of or a combination of an image acquired by the monitoring camera 72, an acceleration acquired by the G sensor 74, an acceleration acquired by the GPS sensor 75, geomagnetism information acquired by the magnetic sensor 76, and image information acquired by the inside camera 322 of the parking lot monitoring apparatus 320. When the magnetic sensor 76 is used, it may be detected that the parking space monitoring apparatus 70 has left the arranged location by detecting the level of a magnetic force from a magnetic marker installed in the arranged location of the parking space monitoring apparatus 70 by the magnetic sensor 76.

Figure 3:
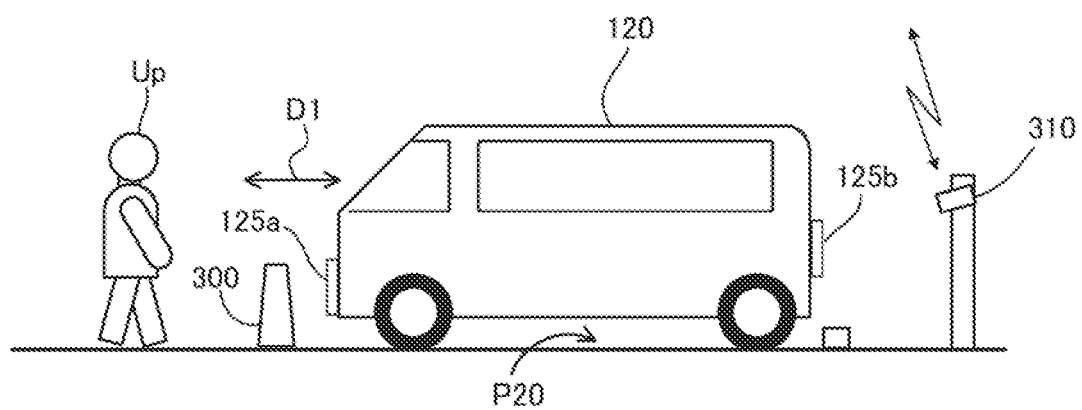
FIG. 3 is an explanatory diagram of how a rental vehicle of the related art is placed in and out.

Now, FIG. 3 illustrates a management aspect of a rental vehicle of the related art. It has been troublesome in that a user Up needs to remove a pylon 300 placed on a traffic line D1 along which the rental vehicle 120 is placed into and out of a standby parking space P20 for a moment when the user Up rents or returns the rental vehicle 120. In order to monitor a vehicle parked in the standby parking space P20, construction for installing a monitoring camera 310 and the like that can photograph a license plate 125a or 125b to which a registration number of the rental vehicle 120 is attached is necessary, and the construction cost is an obstacle when the parking lot is utilized as a standby space of the rental vehicle.

In order to improve a management aspect of the rental vehicle of the related art as above, in this embodiment, as indicated by reference character C10 in FIG. 4, the moveable parking space monitoring apparatus 70 is arranged on the far side of the standby parking space P3 that is out of a traffic line D2 along which the rental vehicle 100 is placed into and out of the standby parking space P3. As a result, when the user U rents or returns the rental vehicle 100, the parking space monitoring apparatus 70 does not necessarily need to be removed. Because the parking space monitoring apparatus 70 includes the monitoring camera 72, the monitoring camera 310 does not necessarily need to be separately installed as illustrated in FIG. 3.

As indicated by reference character C10 in FIG. 4, the parking space monitoring apparatus 70 transmits a photographed image Mon_img of the standby parking space P3 obtained by the monitoring camera 72 to the vehicle rental system 1 in accordance with a request from the vehicle rental system 1 or on a regular basis. The parking space monitoring apparatus 70 senses whether there is a movement of the parking space monitoring apparatus 70 on the basis of detection signals of the G sensor 74, the GPS sensor 75, or the magnetic sensor 76. As indicated by reference character C11 in FIG. 4, the parking space monitoring apparatus 70 transmits movement sensing information Mov_inf to the vehicle rental system 1 when the parking space monitoring apparatus 70 senses that the parking space monitoring apparatus 70 has moved from the arranged location by a predetermined distance or more due to contact and the like with the rental vehicle 100 or the user U.

As described above, by transmitting the movement sensing information Mov_inf when the movement of the parking space monitoring apparatus 70 is sensed, the location information of the parking space monitoring apparatus 70 can be transmitted to the vehicle rental system 1 on a regular basis, and a processing burden and power consumption in the parking space monitoring apparatus 70 can be reduced as compared to a case where the vehicle rental system 1 side determines that the parking space monitoring apparatus 70 has moved from the arranged location by a predetermined distance or more.

Next, as illustrated in FIG. 2, the gate management apparatus 60 includes the communication unit 61, the entrance camera 62, the exit camera 63, the ticket machine 64, the fee adjustment machine 65, and the gate bar 66. The gate management apparatus 60 transmits an image Ent_img of the vehicle entering the parking lot PL photographed by the entrance camera 62 and an image Ext_img of the vehicle exiting the parking lot PL photographed by the exit camera 63 to the vehicle rental system 1.

The ticket machine 64 issues a parking ticket by the ticket machine 64 to the user of the vehicle that enters the parking lot PL, and the fee adjustment machine 65 calculates a parking fee according to the parked time and charges the parking fee when the user of the vehicle exiting the parking lot PL inserts the parking ticket. When the payment of the parking fee by the user ends, the fee adjustment machine 65 lifts up the gate bar 66 and enables the vehicle to exit.

The gate management apparatus 60 performs processing for discounting the parking fee of an eligible user when the gate management apparatus 60 receives parking fee information Pcg_inf transmitted from the vehicle rental system 1. As illustrated in FIG. 1, this processing is executed for the user U that parks the owned vehicle 90 in the standby parking space P3 during the usage of the rental vehicle 100.

Next, the rental vehicle 100 includes a GPS sensor 101, a telematic control unit (TCU) 102, an electronic control unit (ECU) 103, and a card reader 104. The ECU 103 controls operation of the rental vehicle 100, and communicates with the vehicle rental system 1 and the like over the communication network 500 by the TCU 102. The GPS sensor 101 detects the current location of the rental vehicle 100, and the ECU 103 transmits current location information Cps_inf indicating the current location of the rental vehicle 100 to the vehicle rental system 1.

The ECU 103 transmits user identification information Uid_inf read by the card reader 104 to the vehicle rental system 1 when the user U holds a driver's license of the user U over the card reader 104 as described in Japanese Patent Laid-Open No. 2017-165450 described above, for example, in order to use the rental vehicle 100. Then, the ECU 103 receives unlock information Urk_inf transmitted from the vehicle rental system 1 when the user U is authenticated by the user identification information Uid_inf, and unlocks doors of the rental vehicle 100. As with the rental vehicle 100, the owned vehicle 90 also includes a GPS sensor 91, a TCU 92, and an ECU 93. Note that, as identification information for authenticating the user U, a barcode in which a unique identification code issued for the user U is recorded, biological information such as a fingerprint or an iris, and the like may be used.

3. Configuration of Vehicle Rental System

With reference to FIG. 2 and FIG. 5 to FIG. 8, a configuration of the vehicle rental system 1 is described. As illustrated in FIG. 1, a case where the user U reserves and uses the rental vehicle 100 arranged in the parking lot PL is described below.

The vehicle rental system 1 is a computer system formed by a central processing unit (CPU) 10, a memory 40, a communication unit (receiver/transmitter) 50, and the like. The CPU10 corresponds to a processor of the present application. The vehicle rental system 1 communicates with the parking lot management server 400, the gate management apparatus 60, the parking space monitoring apparatus 70, the rental vehicle 100, the owned vehicle 90, and the user terminal 80 by the communication unit 50 over the communication network 500.

In the memory 40, a program 41 for control, a user database (DB) 42, a rental vehicle DB 43, and the like of the vehicle rental system 1 are saved. In the user DB 42, member IDs (identifications), passwords, user information (names, addresses, phone numbers, E-mail addresses, and the like), authentication information at the time of rental, usage histories, and the like of the users for which member registration has been performed for the vehicle rental system 1 are recorded. As the authentication information at the time of rental, for example, as described in Japanese Patent Laid-Open No. 2017-16450 described above, a license number recorded in an IC-embedded license is used. In the user DB 42, owned vehicle identification information for identifying the vehicles owned by the users are recorded. In this embodiment, registration numbers of the owned vehicles are used as the owned vehicle identification information.

In the rental vehicle DB 43, car types of the rental vehicles managed by the vehicle rental system 1, equipment, rental vehicle identification information for identifying the rental vehicles, location points of the standby parking spaces of the rental vehicles, communication addresses of the rental vehicles, and the like are recorded. In this embodiment, registration numbers of the rental vehicles are used as the rental vehicle identification information.

The CPU 10 functions a rental management unit 11, a usage scheduled period recognition unit 12, an owned vehicle identification information recognition unit 13, a rental vehicle identification information recognition unit 14, a parked vehicle identification information recognition unit 15, a parked vehicle identification unit 16, a wrong parking handling unit 17, a rental vehicle location recognition unit 18, a substitute parking space guiding unit 19, an exiting vehicle identification information recognition unit 20, a parking fee setting unit 21, and an empty parking space recognition unit 22 by reading and executing the program 41 for control saved in the memory 40.

Now, the vehicle rental system 1 corresponds to a computer system of the present invention, and a vehicle rental method of the present invention is executed by the vehicle rental system 1. Processing executed by the usage scheduled period recognition unit 12 corresponds to a usage scheduled period recognition step in the vehicle rental method, and processing executed by the owned vehicle identification information recognition unit 13 corresponds to an owned vehicle identification information recognition step in the vehicle rental method. Processing executed by the rental vehicle identification information recognition unit 14 corresponds to a rental vehicle identification information recognition step in the vehicle rental method, and processing executed by the parked vehicle identification information recognition unit 15 corresponds to a parked vehicle identification information recognition step in the vehicle rental method. Processing executed by the parked vehicle identification unit 16 corresponds to a parked vehicle identification step in the vehicle rental method, and processing executed by the wrong parking handling unit 17 corresponds to a wrong parking handling step in the vehicle rental method.

The rental management unit 11 receives vehicle reservation application information Cu_req transmitted from the user terminal 80, accepts the usage reservation of the vehicle by the user U, and searches a reservable rental vehicle. In the vehicle reservation application information Cu_req, information on the car type, the equipment, the usage scheduled period, receiving and returning places of the vehicle, and the like specified by the user U on the reservation app is included. When the reservable rental vehicle is secured, the rental management unit 11 saves vehicle reservation information according to the vehicle reservation application information Cu_req in the rental vehicle DB 43, and transmits reservation completion information Rzv_cpl that provides a notification indicating that the reservation is completed to the user terminal 80.

The usage scheduled period recognition unit 12 recognizes the usage scheduled period set for the rental vehicle 100 with reference to the vehicle reservation information saved in the rental vehicle DB 43. The owned vehicle identification information recognition unit 13 recognizes the registration number (corresponding to the owned vehicle identification information) of the owned vehicle 90 owned by the user U with reference to the user DB 42. The rental vehicle identification information recognition unit 14 recognizes the registration number (corresponding to the rental vehicle identification information) of the rental vehicle 100 with reference to the rental vehicle DB 43.

The parked vehicle identification information recognition unit 15 receives the photographed image Mon_img of the standby parking space P3 transmitted from the parking space monitoring apparatus 70, and executes processing for extracting an image portion of the vehicle from the photographed image Mon_img. When the image portion of the vehicle is extracted from the photographed image Mon_img, the parked vehicle identification information recognition unit 15 recognizes the registration number (corresponding to parked vehicle identification information) of the vehicle included in the image portion of the vehicle.

When the registration number of the parked vehicle in the standby parking space P3 or P4 is recognized by the parked vehicle identification information recognition unit 15, the parked vehicle identification unit 16 determines whether the parked vehicle is the rental vehicle 100 or the owned vehicle 90 with reference to the registration number of the owned vehicle 90 recognized by the owned vehicle identification information recognition unit 13 and the registration number of the rental vehicle 100 recognized by the rental vehicle identification information recognition unit 14.

The wrong parking handling unit 17 executes the wrong parking handling processing for removing the parked vehicle when the parked vehicle identification unit 16 determines that the parked vehicle in the standby parking space P3 or P4 is not the rental vehicle 100 or the owned vehicle 90 within the usage scheduled period of the rental vehicle 100 recognized by the usage scheduled period recognition unit.

Figure 5:
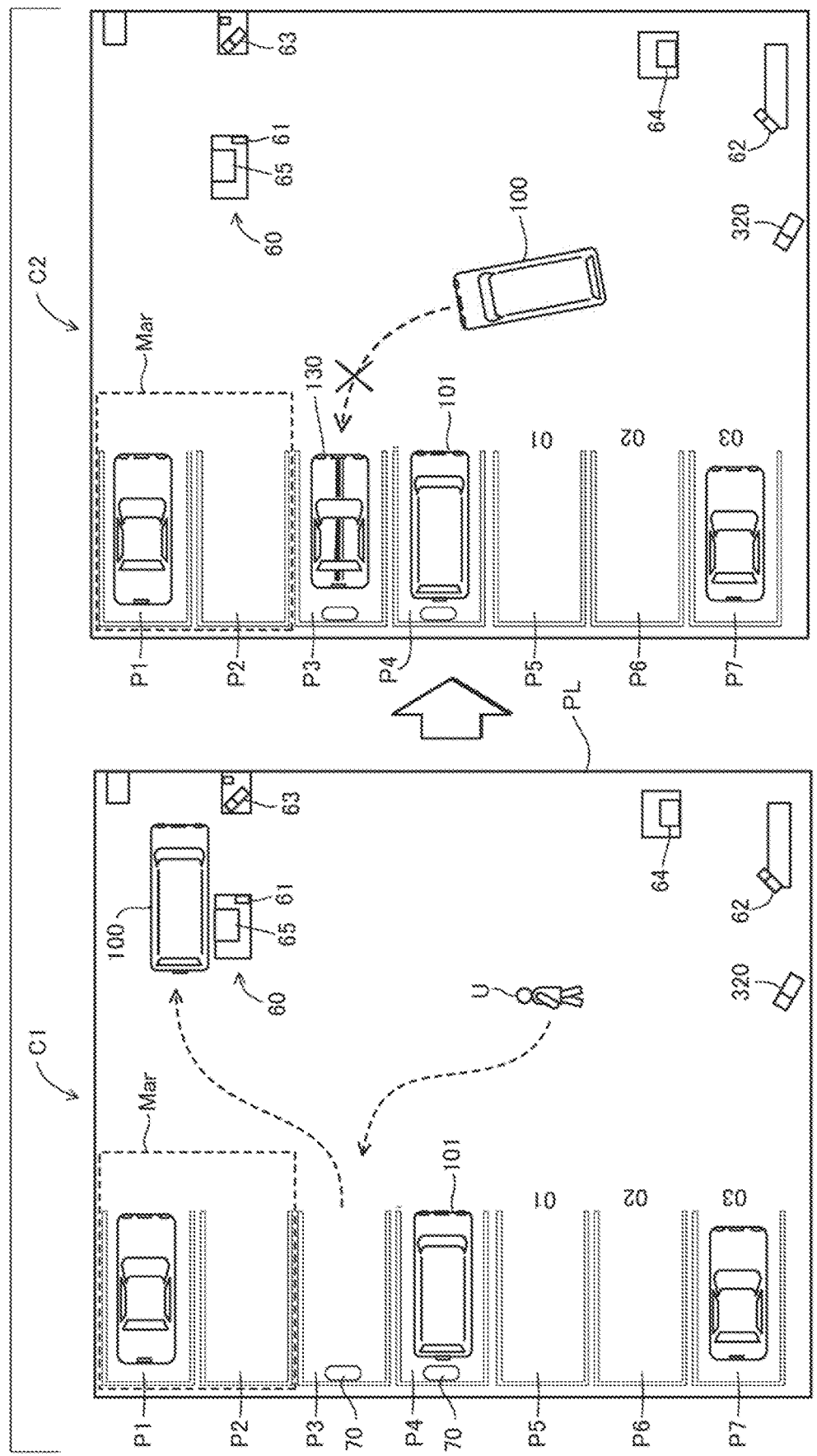
FIG. 5 is an explanatory diagram of an inconvenience that may occur when a user comes to a standby parking space of the rental vehicle on foot.

Now, with reference to FIG. 5, a situation in which a vehicle 130 other than the rental vehicle 100 or the owned vehicle 90 is parked in the standby parking space P3 is described. As indicated in reference character C1 in FIG. 5, when the user U comes to the parking lot PL on foot, the standby parking space P3 is in an empty state after the user U starts using the rental vehicle 100 and the rental vehicle 100 exits the parking lot PL.

When the other vehicle 130 is parked in the standby parking space P3 as indicated by reference character C2 in this state, the user U that has come back to the parking lot PL by the rental vehicle 100 for returning cannot place the rental vehicle 100 back to the standby parking space P3.

Thus, the wrong parking handling unit 17 notifies the parking lot management server 400 of the registration number of the other vehicle 130 parked in the standby parking space P3, and transmits parked vehicle removal request information Rmv_req for requesting the removal of the other vehicle 130 from the standby parking space P3, for example, as the wrong parking handling processing.

The parking lot management server 400 that has received the parked vehicle removal request information Rmv_req executes handling processing such as processing of outputting a voice guidance prompting the movement of the other vehicle 130 from the standby parking space P3 from a speaker (not shown) provided in the parking lot PL, processing of reporting the other vehicle 130 that is wrongly parked to responsible police, and the like.

Figure 6:
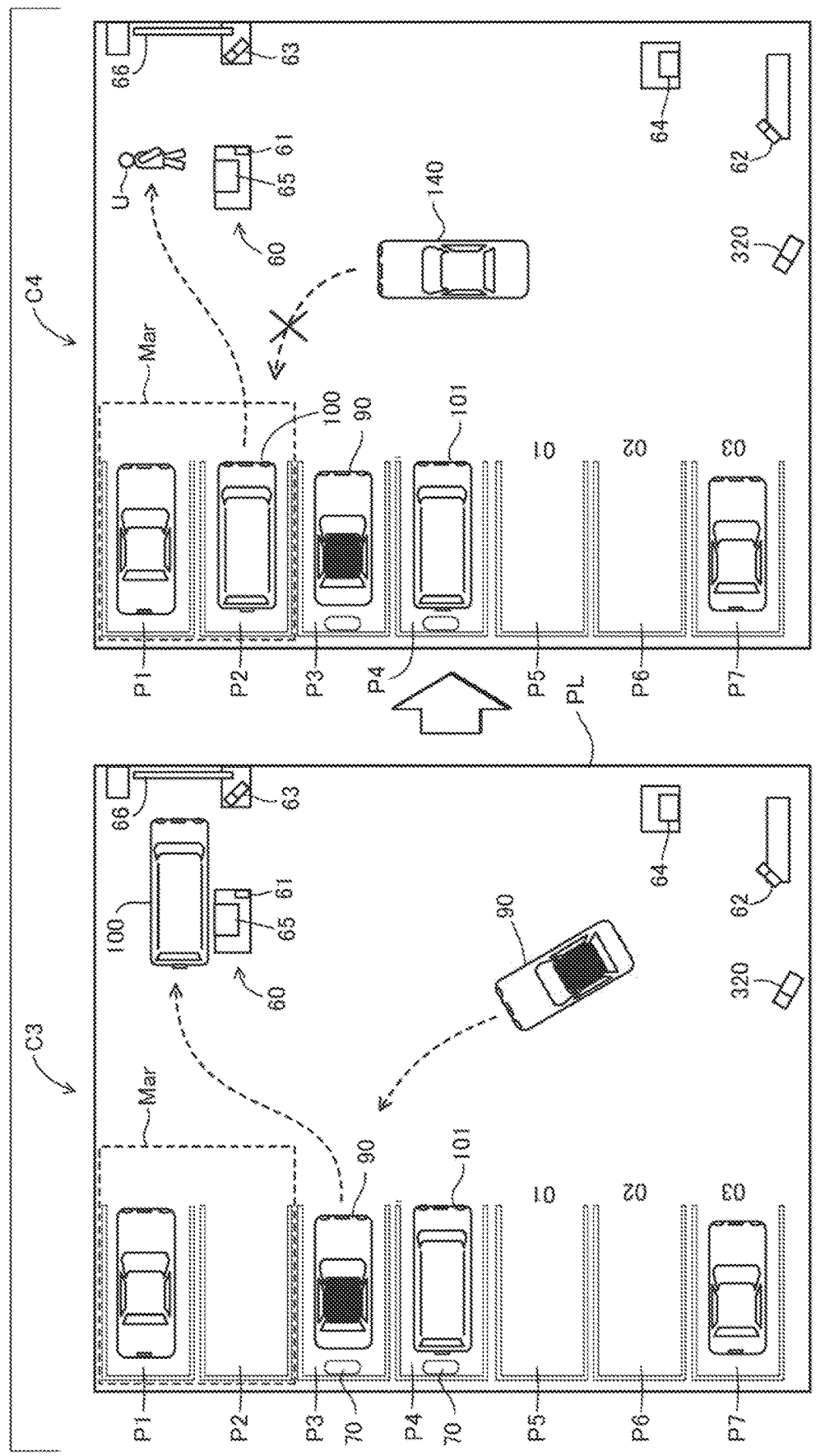
FIG. 6 is an explanatory diagram of an inconvenience that may occur when the user comes to the standby parking space of the rental vehicle by an owned vehicle.

Reference character C3 in FIG. 6 indicates a situation in which the user U comes to the parking lot PL by the owned vehicle 90, replaces the rental vehicle 100 with the owned vehicle 90, and exits the parking lot PL by the owned vehicle 90. In this case, the owned vehicle 90 is in a state of being parked in the standby parking space P3 while the user U is using the rental vehicle 100.

When the user U that has come back to the parking lot PL by the rental vehicle 100 for returning fails to replace the rental vehicle 100 and the owned vehicle 90 with each other, parks the rental vehicle 100 in the empty monthly parking space P2, and goes to a nearby restaurant and the like as indicated by reference character C4 in this state, the contractor of the monthly parking space P2 cannot park a vehicle 140 of the contractor in the monthly parking space P2.

Thus, the wrong parking handling unit 17 executes the wrong parking handling processing for the owned vehicle 90 when the parked vehicle identification unit 16 identifies that the user U is parking the owned vehicle 90 as indicated by reference character C4 in FIG. 6 after the usage scheduled period has elapsed. As a result, the monthly parking space P2 can be brought back to an empty state by prompting the user U to replace the owned vehicle 90 and the rental vehicle 100 with each other, or forcibly removing the owned vehicle 90 from the standby parking space P3 and moving the rental vehicle 100 to the standby parking space P3.

The rental vehicle location recognition unit 18 receives the current location information Cps_inf transmitted from the rental vehicle 100, and recognizes the current location of the rental vehicle 100. The empty parking space recognition unit 22 recognizes an empty parking space in the parking lot PL or around the parking lot PL. The empty parking space recognition unit 22 receives a photographed image PLh_img of the inside of the parking lot PL obtained by the inside camera 322 from the parking lot monitoring apparatus 320, and recognizes whether there is an empty space in the pay-by-the-hour parking spaces P5 to P7. The empty parking space recognition unit 22 acquires information on the empty parking space near the parking lot PL from the parking lot management server 400, and recognizes the empty parking space other than the parking lot PL.

The substitute parking space guiding unit 19 estimates the returning of the rental vehicle 100 by recognizing that the rental vehicle 100 is approaching the parking lot PL from the current location of the rental vehicle 100 recognized by the rental vehicle location recognition unit 18. When the substitute parking space guiding unit 19 estimates the returning of the rental vehicle 100, the following occurs. When the parked vehicle identification unit 16 identifies that the other vehicle 130 is parked in the standby parking space P3 as indicated by reference character C2 in FIG. 5, substitute parking space information providing a notification of a place of an empty parking space recognized by the empty parking space recognition unit 22 is transmitted to the user terminal 80 or the ECU 103 of the rental vehicle 100.

The user terminal 80 or the ECU 103 of the rental vehicle 100 that has received the substitute parking space information provides a report (displays a guide map to a display unit, outputs a guidance voice from the speaker, and the like) that guides the user U to a substitute parking space. The user U can return the rental vehicle 100 to the substitute parking space in accordance to this guidance.

The exiting vehicle identification information recognition unit 20 receives the image Ext_img of the vehicle exiting the parking lot PL transmitted from the gate management apparatus 60, and recognizes a registration number (corresponding to exiting vehicle identification information) included in the image Ext_img. The parking fee setting unit 21 recognizes the exiting time of the owned vehicle 90 from the parking lot PL, and executes processing for discounting the parking fee in accordance with the exiting time on the basis of the recognition result obtained by the exiting vehicle identification information recognition unit 20.

Figure 7:
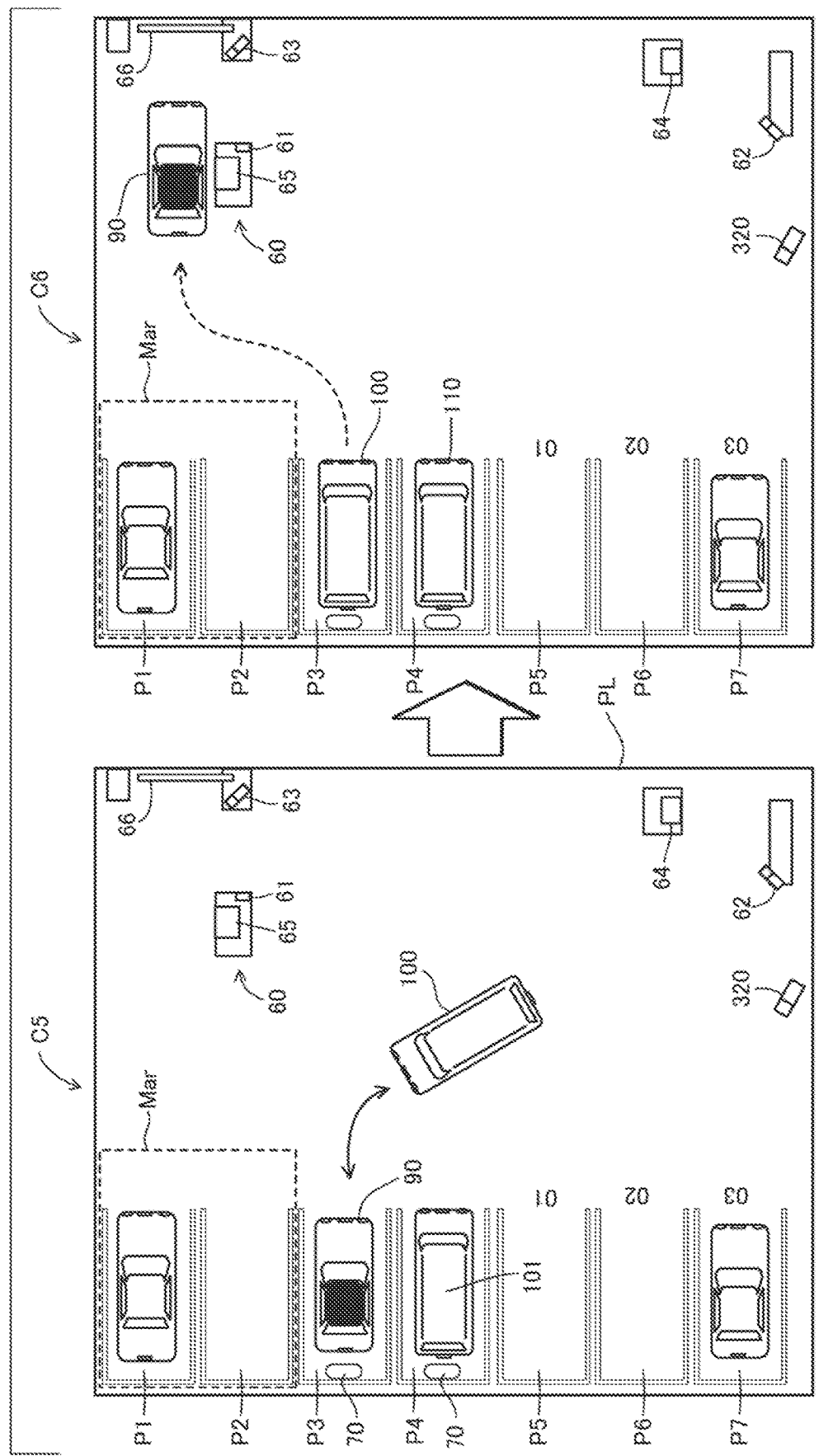
FIG. 7 is an explanatory diagram of an aspect in which the user uses the rental vehicle by replacing the rental vehicle with the owned vehicle.

Now, FIG. 7 illustrates a situation in which the user U replaces the rental vehicle 100 with the owned vehicle 90 parked in the standby parking space P3 as indicated by reference character C5, and exits the parking lot PL by the owned vehicle 90 as indicated by reference character C6 when the user U returns the rental vehicle 100. In this case, the parking fee setting unit 21 transmits the parking fee information Pcg_inf instructing that the parking fee to be free of charge when the exiting time of the owned vehicle 90 is within a scheduled usage period of the rental vehicle 100 to the gate management apparatus 60.

The gate management apparatus 60 sets the parking fee to be free of charge when the user U inserts the parking ticket to the fee adjustment machine 65 in accordance with the parking fee information Pcg_inf. As a result, the user U can use the rental vehicle 100 without paying the parking fee. Therefore, when one area of the gated parking lot PL is utilized as the standby parking space of the rental vehicle, a cutout for entering and exiting the standby parking space without passing through a gate for the pay-by-the-hour parking space does not necessarily need to be provided.

Figure 8:
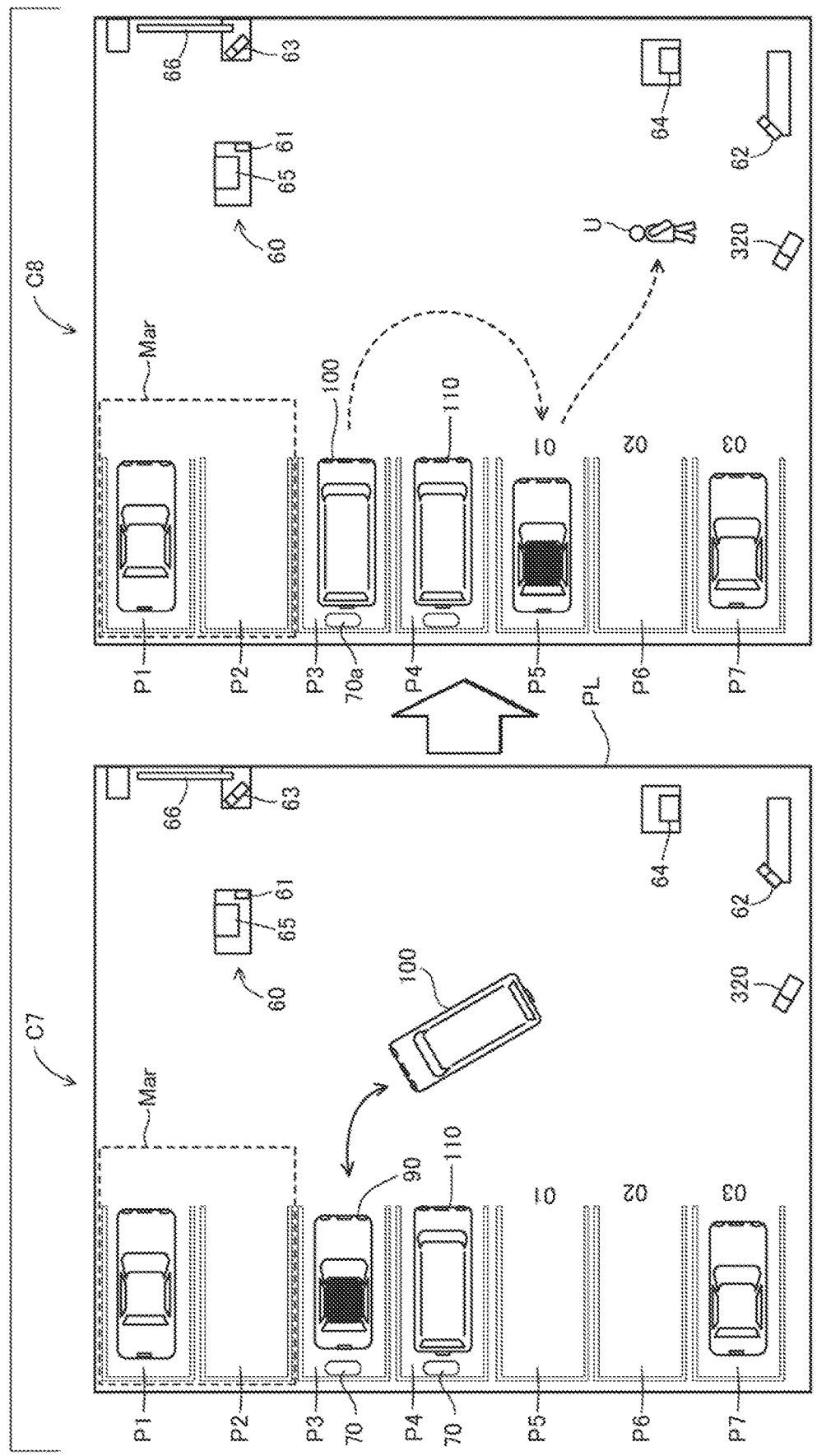
FIG. 8 is an explanatory diagram for a case where the user parks the owned vehicle in a pay-by-the-hour parking space after returning the rental vehicle.

FIG. 8 illustrates a situation in which the user U parks the owned vehicle 90 in the pay-by-the-hour parking space P5 and goes to a nearby restaurant and the like as indicated by reference character C8 after replacing the rental vehicle 100 with the owned vehicle 90 parked in the standby parking space P3 as indicated by reference character C7 when the user U returns the rental vehicle 100.

In this case, the parking fee setting unit 21 transmits the parking fee information Pcg_inf instructing the parking fee to be charged by considering the time at which the user U replaces the rental vehicle 100 with the owned vehicle 90 to the time at which the owned vehicle 90 exits the parking lot PL as the usage time to the gate management apparatus 60.

The gate management apparatus 60 charges the parking fee by considering the time at which the user U replaces the rental vehicle 100 with the owned vehicle 90 to the time at which the owned vehicle 90 exits the parking lot PL as the usage time when the user U inserts the parking ticket to the fee adjustment machine 65 in accordance with the parking fee information Pcg_inf. As a result, after the user U returns the rental vehicle 100, the user U can park the owned vehicle 90 in the parking lot PL and run errands at a nearby place by only paying the parking fee from a time point at which the rental vehicle 100 is returned.

When the user U fails to replace the owned vehicle 90 with the rental vehicle 100 and parks the owned vehicle 90 in the pay-by-the-hour parking spaces P5 to P7 from the start when the user U rents the rental vehicle 100, the processing for causing the parking fee during the usage scheduled period to be free of charge by the parking fee setting unit 21 is not executed. Therefore, the user U needs to pay a normal parking fee (a parking fee in accordance with the time from the entering to the exiting of the parking lot PL) when exiting the parking lot PL. As a result, the user U can be prompted to replace the rental vehicle 100 with the owned vehicle 90 in order to avoid the payment of the parking fee.

Note that a discount apparatus for the parking fee may be provided in the rental vehicle 100, in the parking space monitoring apparatus 70, or in a fee adjustment system separate from the gate management apparatus 60, and discount information may be recorded on the parking ticket by the discount apparatus in accordance with the parking fee information Pcg_inf. According to this configuration, the gate management apparatus 60 does not necessarily need to have a configuration that handles the rental of the vehicle.

4. Processing for Monitoring Standby Parking Space by Vehicle Rental System

Figure 9:
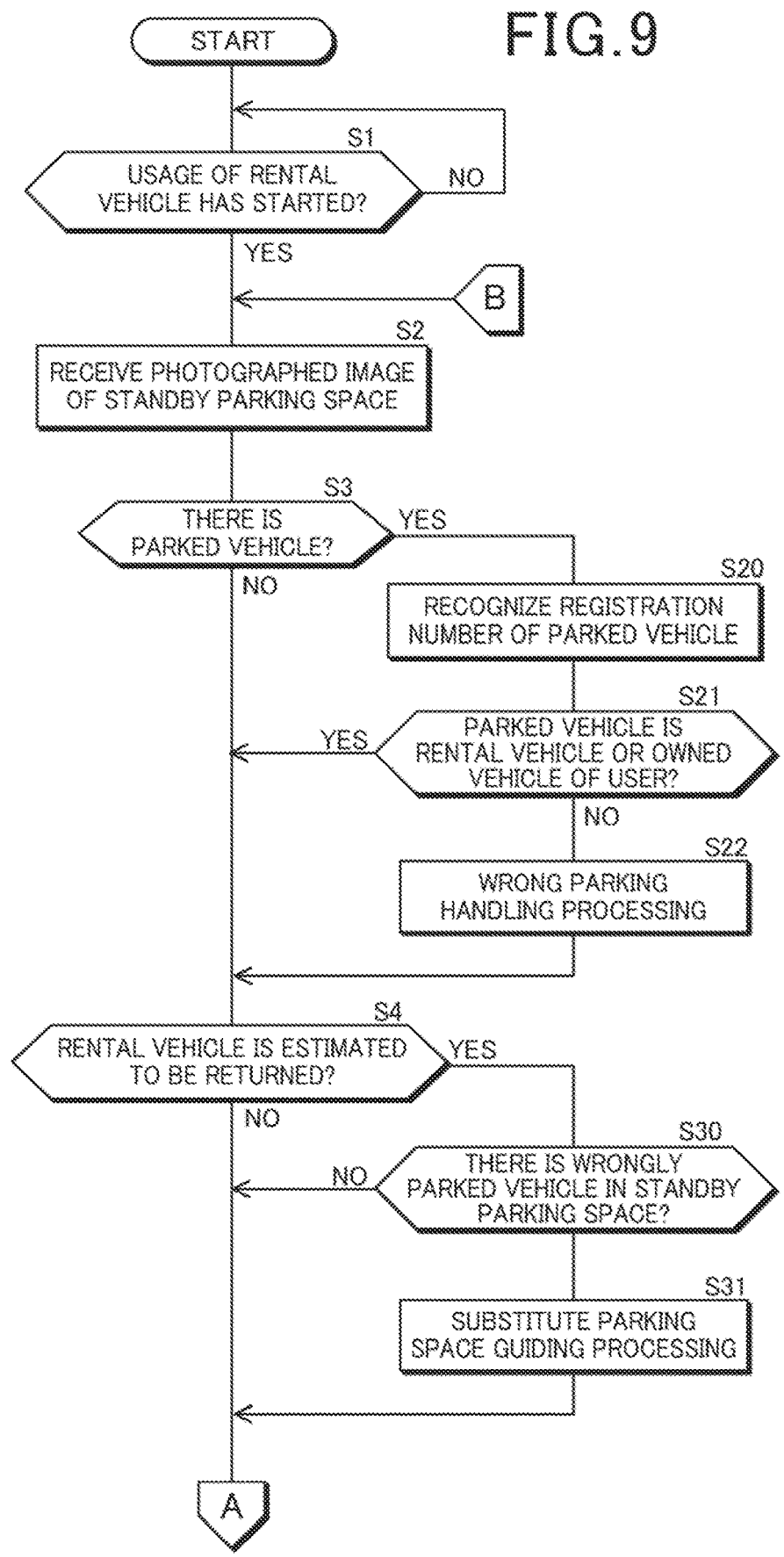
FIG. 9 is a flowchart of processing of monitoring the standby parking space.
Figure 10:
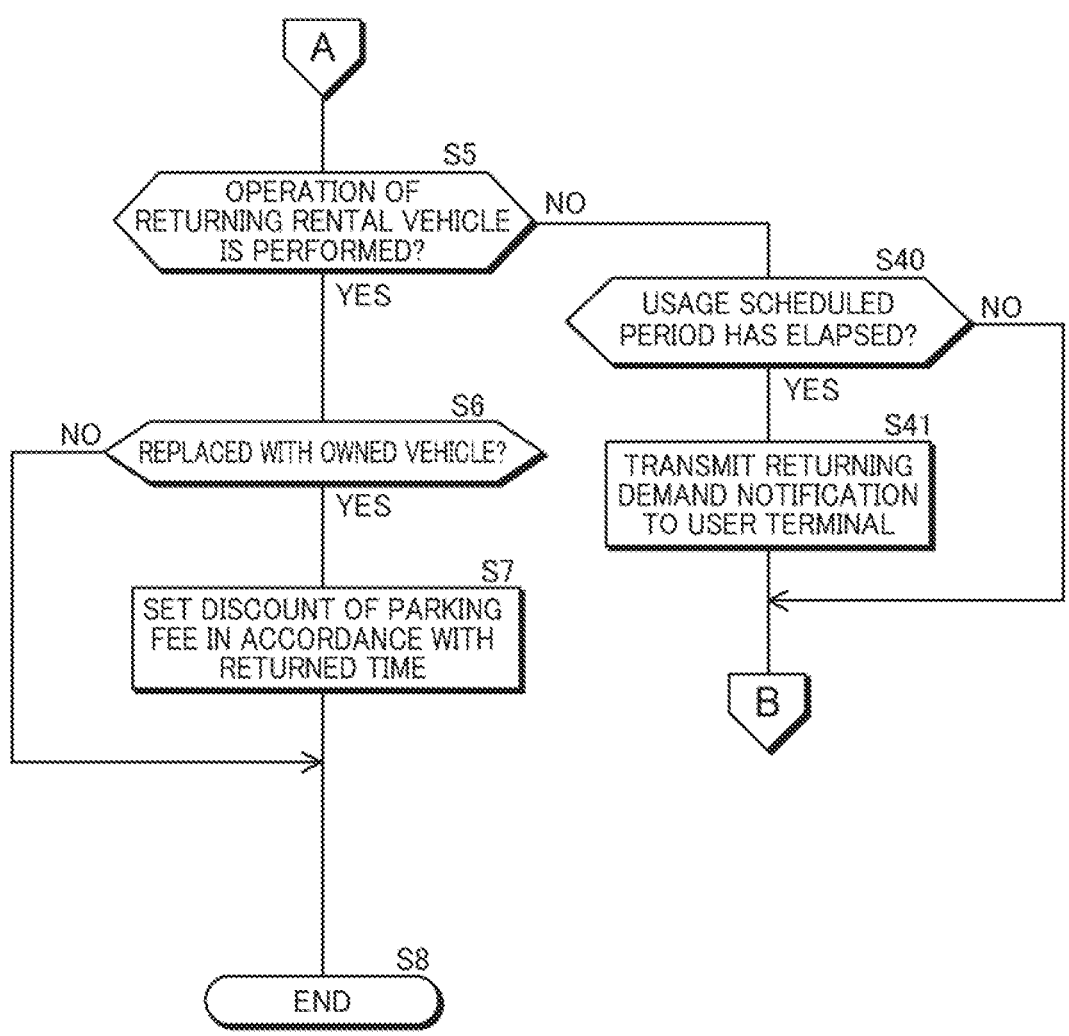
FIG. 10 is a flowchart of return handling processing of the rental vehicle.

In accordance with flowcharts illustrated in FIG. 9 to FIG. 10, an execution procedure of processing for monitoring the standby parking space executed by the vehicle rental system 1 is described. In Step S1 in FIG. 9, the rental management unit 11 causes the processing to progress to Step S2 when the user U starts using the rental vehicle 100. The rental management unit 11 recognizes that the user U has started using the rental vehicle 100 when the user U holds the license over the card reader 104 of the rental vehicle 100 and the authentication of the user U succeeds.

In Step S2, the parked vehicle identification information recognition unit 15 receives the photographed image Mon_img of the standby parking space P3 transmitted from the parking space monitoring apparatus 70. Then, the parked vehicle identification information recognition unit 15 causes the processing to progress to Step S20 when a parked vehicle is recognized from the photographed image Mon_img, and causes the processing to progress to Step S4 when a parked vehicle is not recognized from the photographed image Mon_img.

In Step S20, the parked vehicle identification information recognition unit 15 recognizes the registration number of the parked vehicle by performing character extraction processing on the image of the parked vehicle included in the photographed image Mon_img. In next Step S21, the parked vehicle identification unit 16 determines whether the parked vehicle is the rental vehicle 100 or the owned vehicle 90 with reference to the registration number of the owned vehicle 90 recognized by the owned vehicle identification information recognition unit 13 and the registration number of the rental vehicle 100 recognized by the rental vehicle identification information recognition unit 14. Then, the parked vehicle identification unit 16 causes the processing to progress to Step S22 when the parked vehicle is neither the rental vehicle 100 nor the owned vehicle 90, and causes the processing to progress to Step S4 when the parked vehicle is the rental vehicle 100 or the owned vehicle 90.

In Step S22, as described above, the wrong parking handling unit 17 executes the wrong parking handling processing for removing the vehicle (the vehicle that is neither the rental vehicle 100 nor the owned vehicle 90) that is wrongly parked in the standby parking space P3, and causes the processing to progress to Step S4.

In Step S4, the substitute parking space guiding unit 19 estimates whether the rental vehicle 100 is approaching the parking lot PL to be returned on the basis of the current location of the rental vehicle 100 recognized by the rental vehicle location recognition unit 18. Then, the substitute parking space guiding unit 19 causes the processing to progress to Step S30 when the rental vehicle 100 is estimated to return, and causes the processing to progress to Step S5 in FIG. 10 when the rental vehicle 100 is not estimated to return.

In Step S30, the substitute parking space guiding unit 19 determines whether there is a vehicle (wrongly parked vehicle) that is wrongly parked in the standby parking space P3 from the identification result of the parked vehicle identification unit 16. Then, the substitute parking space guiding unit 19 causes the processing to progress to Step S31 when there is a wrongly parked vehicle, and causes the processing to progress to Step S5 in FIG. 10 when there are no wrongly parked vehicles. In Step S31, as described above, the substitute parking space guiding unit 19 executes substitute parking space guiding processing for transmitting the substitute parking space information that provides a notification of the place of the substitute parking space to the user terminal 80 or the rental vehicle 100, and causes the processing to progress to Step S5 in FIG. 10.

In Step S5 in FIG. 10, the rental management unit 11 determines whether an operation of returning the rental vehicle 100 is performed by the user U. The rental management unit 11 determines that the operation of returning the rental vehicle 100 is performed when the user U holds the license over the card reader 104 of the rental vehicle 100 while conditions such as the rental vehicle 100 being parked in the standby parking space P3 and a key of the rental vehicle 100 being placed back to a predetermined place in a glove box, for example, are satisfied.

Then, the rental management unit 11 causes the processing to progress to Step S6 when the operation of returning the rental vehicle 100 is performed by the user U, and causes the processing to progress to Step S40 when the operation of returning the rental vehicle 100 is not performed.

In Step S6, the parking fee setting unit 21 determines whether the user U has replaced the owned vehicle 90 with the rental vehicle 100 when staring the usage of the rental vehicle 100. The replacement of the owned vehicle 90 with the rental vehicle 100 can be recognized from the photographed image Mon_img of the standby parking space P3 transmitted from the parking space monitoring apparatus 70. Then, the parking fee setting unit 21 causes the processing to progress to Step S7 when the replacement of the owned vehicle 90 with the rental vehicle 100 is performed. In Step S7, the parking fee setting unit 21 performs processing for setting the parking fee by discounting the parking fee in accordance with the time at which the user U exits the parking lot PL by the owned vehicle 90 as described above.

Meanwhile, when the replacement of the owned vehicle 90 with the rental vehicle 100 is not performed, the parking fee setting unit 21 causes the processing to progress to Step S8, and does not execute the processing for discounting the parking fee. When the replacement of the rental vehicle 100 with the owned vehicle 90 is not performed because the user U has come to the parking lot PL on foot, the parking fee is not incurred, and hence the processing for discounting the parking fee is unnecessary.

When the user U fails to the replace the rental vehicle 100 with the owned vehicle 90 and parks the owned vehicle 90 in the pay-by-the-hour parking spaces P5 to P7 and the like other than the standby parking space P3 when the user U comes to the parking lot PL by the owned vehicle 90, the normal parking fee is charged, and hence the processing for discounting the parking fee is unnecessary.

In Step S40, the rental management unit 11 determines whether the usage scheduled period of the rental vehicle 100 in accordance with the user U has elapsed. Then, the rental management unit 11 causes the processing to progress to Step S41 when the usage scheduled period has elapsed, and causes the processing to progress to Step S2 in FIG. 9 and executes the processing in Step S3 and steps thereafter again when the usage scheduled period has not elapsed. In Step S41, the rental management unit 11 prompts the rental vehicle 100 to be returned by transmitting usage period exceeding information that provides a notification indicating that the usage scheduled period of the rental vehicle 100 has elapsed to the user terminal 80.

5. Management Processing of Parking Space Monitoring Apparatus

In accordance with a flowchart illustrated in FIG. 11, an execution procedure of management processing of the parking space monitoring apparatus executed by the parked vehicle identification information recognition unit 15 is described. The parked vehicle identification information recognition unit 15 causes the processing to progress to Step S101 when the movement sensing information Mov_inf transmitted from the parking space monitoring apparatus 70 is received as described above with reference to FIG. 4.

In Step S101, the parked vehicle identification information recognition unit 15 transmits instructing information for instructing the parking space monitoring apparatus 70 to output a voice guidance instructing the parking space monitoring apparatus 70 to be placed back to the original location to the parking space monitoring apparatus 70. The parking space monitoring apparatus 70 that has received the instructing information outputs a voice guidance saying "please place the monitoring apparatus back to its original location", for example, from the speaker 73, and prompts the user U to place the parking space monitoring apparatus 70 back to the original location.

In next Step S102, the parked vehicle identification information recognition unit 15 determines whether location returning information Rtn_inf providing a notification indicating that the parking space monitoring apparatus 70 is placed back to the original location is received from the parking space monitoring apparatus 70. Then, the parked vehicle identification information recognition unit 15 causes the processing to progress to Step S103 when the location returning information Rtn_inf is received, and causes the processing to progress to Step S110 when the location returning information Rtn_inf is not received.

In Step S110, the parked vehicle identification information recognition unit 15 transmits location returning request information for requesting the parking space monitoring apparatus 70 to be placed back to the original location to the parking lot management server 400. The parking lot management server 400 that has received the location returning request information notifies a facility manager of the parking lot PL to place the parking space monitoring apparatus 70 back to the original location, and a facility manager performs an operation of placing the parking space monitoring apparatus 70 back to the original location for the parking lot PL.

6. Other Embodiments

In the abovementioned embodiment, the registration number attached to the license plate of the vehicle is used as the identification information of the vehicles such as the rental vehicle 100 and the owned vehicle 90, but another type of identification information may be used. For example, a vehicle body number unique to the vehicle may be used as the identification information of the vehicle, information on the vehicle body number may be saved in a memory included in the ECU of each vehicle, and the information on the vehicle body number may be transmitted from each vehicle to the vehicle rental system 1 in a direct manner or via the parking space monitoring apparatus 70. Alternatively, a vehicle ID issued by the vehicle rental system 1 may be used as the identification number of the vehicle.

In the abovementioned embodiment, an example in which the standby parking spaces P3 and P4 for the rental vehicles 100 and 110 are provided in the parking lot PL having the mechanical gate is described, but the standby parking space may be provided in the parking lot without the mechanical gate. In this case, the exiting vehicle identification information recognition unit 20 and the parking fee setting unit 21 are unnecessary.

In the abovementioned embodiment, the rental vehicle location recognition unit 18 and the substitute parking space guiding unit 19 are included and the processing for guiding the user to the substitute parking space is performed when another vehicle is parked in the standby parking space P3 when the rental vehicle 100 is estimated to return, but a configuration in which the rental vehicle location recognition unit 18 and the substitute parking space guiding unit 19 are omitted may be employed.

In the abovementioned embodiment, the wrong parking handling unit 17 performs the wrong parking remove processing for removing the owned vehicle 90 from the standby parking space P3 when it is recognized that the owned vehicle 90 is parked in the standby parking space P3 after the usage scheduled period has elapsed, but a configuration in which the wrong parking remove processing in this case is not performed may be employed.

In the abovementioned embodiment, it is possible to configure only the vehicle rental system 1 as the vehicle rental system of the present invention, and the vehicle rental system of the present invention may be configured by the vehicle rental system 1 and the parking space monitoring apparatus 70. When only the vehicle rental system 1 is configured as the vehicle rental system of the present invention, the photographed image of the standby parking space may be acquired by the monitoring camera 310 installed in the parking lot as illustrated in FIG. 3 without using the parking space monitoring apparatus 70.

In the abovementioned embodiment, the vehicle rental system 1 is configured as a server system that communicates with the parking space monitoring apparatus 70 and the like over the communication network 500, but the vehicle rental system 1 may be configured as a part of a function of a computer system configuring the gate management apparatus 60, for example.

In the abovementioned embodiment, a configuration in which the user U that desires to use a vehicle by car sharing downloads the reservation app (application program) for car sharing provided by the vehicle rental system 1 on the user terminal 80 and reserves the usage of the rental vehicle is described, but a configuration in which the usage of the rental vehicle is reserved by accessing an Internet site operated by the vehicle rental system 1 may be employed.

Note that FIG. 2 is a schematic diagram illustrating functional configurations of the vehicle rental system 1 by performing classifying the functional configurations in accordance with main processing contents in order to make the invention of this application easier to understand, and the configuration of the vehicle rental system 1 may be configured in accordance with other classifications. The processing of each of the components may be executed by one hardware unit, or may be executed by a plurality of hardware units. The processing of the components illustrated in FIG. 9 to FIG. 11 may be executed by one program or may be executed by a plurality of programs.

7. Configurations Supported by Abovementioned Embodiments

The abovementioned embodiments are specific examples of the following configurations.

(First Item) A vehicle rental system, including: a usage scheduled period recognition unit that recognizes a usage scheduled period of a rental vehicle; an owned vehicle identification information recognition unit that recognizes owned vehicle identification information for identifying an owned vehicle of a user of the rental vehicle in the usage scheduled period; a rental vehicle identification information recognition unit that recognizes rental vehicle identification information for identifying the rental vehicle; a parked vehicle identification information recognition unit that recognizes parked vehicle identification information for identifying a parked vehicle in a standby parking space that is a parking space during rental standby for the rental vehicle; a parked vehicle identification unit that determines whether the parked vehicle in the standby parking space is the rental vehicle or the owned vehicle on the basis of the parked vehicle identification information, the rental vehicle identification information, and the owned vehicle identification information; and a wrong parking handling unit that executes wrong parking handling processing for removing the parked vehicle in the standby parking space when the parked vehicle identification unit determines that the parked vehicle in the standby parking space is not the rental vehicle or the owned vehicle within the usage scheduled period.

According to the vehicle rental system of the first item, the parked vehicle identification unit determines whether the parked vehicle in the standby parking space of the rental vehicle is the owned vehicle of the user or the rental vehicle. When the parked vehicle in the standby parking space is not the owned vehicle of the user or the rental vehicle during the usage scheduled period of the rental vehicle, the wrong parking handling processing executes the wrong parking handling unit and the parked vehicle is removed. As a result, the user can prevent the inconveniences that may occur due to the rental form in which the user uses the rental vehicle by replacing the rental vehicle with the owned vehicle.

(Second Item) The vehicle rental system according to the first item, further including: a rental vehicle location recognition unit that recognizes a current location of the rental vehicle; and a substitute parking space guiding unit that transmits information on an empty parking space other than the standby parking space to a user terminal used by the user when the parked vehicle identification unit determines that the parked vehicle in the standby parking space is not the owned vehicle when returning of the rental vehicle to the standby parking space is estimated in advance on the basis of the current location of the rental vehicle recognized by the rental vehicle location recognition unit.

According to the vehicle rental system of the second item, when the rental vehicle cannot return to the standby parking space due to the vehicle other than the owned vehicle being parked in the standby parking space during the usage of the rental vehicle, the rental vehicle can return to another parking space.

(Third Item) The vehicle rental system according to the first item or the second item, in which the wrong parking handling unit executes the wrong parking handling processing when the parked vehicle identification unit determines that the parked vehicle in the standby parking space is the owned vehicle after the usage scheduled period elapses.

According to the vehicle rental system of the third item, when the user fails to replace the owned vehicle with the rental vehicle and parks the rental vehicle in another parking space while parking the owned vehicle in the standby parking space when the user returns the rental vehicle, the wrong parking handling processing for removing the owned vehicle from the standby parking space is executed. As a result, the other parking spaces can be used by prompting the removal of the owned vehicle from the standby parking space and the movement of the rental vehicle to the standby parking space.

(Fourth Item) The vehicle rental system according to any one of the first item to the third item, further including a parking space monitoring apparatus that is moveably arranged in the standby parking space including: a camera photographs the standby parking space; and a photographed image transmission unit that transmits a photographed image obtained by the camera, in which the parked vehicle identification information recognition unit acquires the photographed image of the standby parking space transmitted from the parking space monitoring apparatus as the parked vehicle identification information.

According to the vehicle rental system of the fourth item, by arranging the moveable parking space monitoring apparatus in the standby parking space, the configuration in which the standby parking space is monitored can be easily attained without performing construction for installing the camera for monitoring the standby parking space and the like.

(Fifth Item) The vehicle rental system according to the fourth item, in which the parking space monitoring apparatus includes: a movement sensor that detects movement of the parking space monitoring apparatus; and a movement reporting unit that performs movement reporting when the movement sensor detects that the parking space monitoring apparatus is moved by an amount exceeding a predetermined movement threshold.

According to the vehicle rental system of the fifth item, the power consumption in the parking space monitoring apparatus can be reduced as compared to a case where the location of the parking space monitoring apparatus is constantly transmitted.

(Sixth Item) The vehicle rental system according to any one of the first item to the fifth item, in which the standby parking space is arranged to be placed side by side with a pay parking space in a parking lot, the vehicle rental system further including: an exiting vehicle identification information recognition unit that recognizes exiting vehicle identification information for identifying an exiting vehicle that arrives at an exit of the parking lot; and a parking fee setting unit that determines, when the exiting vehicle identification information recognition unit recognizes the exiting vehicle identification information for a predetermined exiting vehicle that reaches the exit within the usage scheduled period, whether the predetermined exiting vehicle is the owned vehicle on the basis of the owned vehicle identification information and reduces a charge of usage fee of the parking lot for the user when the predetermined exiting vehicle is the owned vehicle and the parked vehicle identification unit determines that the parked vehicle in the standby parking space is the owned vehicle within the usage scheduled period.

According to the vehicle rental system of the sixth item, when the standby parking space is provided in the parking lot that adjusts the parking fee at the exit, the parking fee can be reduced (including a case of making the parking fee free of charge) for the user that has come to the parking lot by the owned vehicle and has used the rental vehicle by replacing the owned vehicle and the rental vehicle with each other. As a result, an equipment serving as a partition between the pay parking space and the standby parking space for avoiding the incurrence of the parking fee due to entering and exiting the standby parking space by the owned vehicle can be unnecessary.

(Seventh Item) A vehicle rental method executed by a computer system, the vehicle rental method including: a usage scheduled period recognition step of recognizing a usage scheduled period of a rental vehicle; an owned vehicle identification information recognition step of recognizing owned vehicle identification information for identifying an owned vehicle of a user of the rental vehicle in the usage scheduled period; a rental vehicle information recognition step of recognizing rental vehicle identification information for identifying the rental vehicle; a parked vehicle identification information recognition step of recognizing parked vehicle identification information for identifying a parked vehicle in a standby parking space that is a parking space during rental standby for the rental vehicle; a parked vehicle identification step of determining whether the parked vehicle in the standby parking space is the rental vehicle or the owned vehicle on the basis of the parked vehicle identification information, the rental vehicle identification information, and the owned vehicle identification information; and a wrong parking handling step of executing wrong parking handling processing for removing the parked vehicle in the standby parking space when it is determined that the parked vehicle in the standby parking space is not the rental vehicle or the owned vehicle by the parked vehicle identification step within the usage scheduled period.

According to the vehicle rental method of the seventh item, the parked vehicle identification step determines whether the parked vehicle in the standby parking space of the rental vehicle is the owned vehicle of the user or the rental vehicle. Then, when it is determined that the parked vehicle in the standby parking space is the owned vehicle of the user or the rental vehicle within the usage scheduled period of the rental vehicle, the wrong parking handling processing is executed by the wrong parking handling step and the parked vehicle is removed. As a result, the inconveniences that may occur due to the rental form in which the user uses the rental vehicle by replacing the rental vehicle with the owned vehicle can be prevented.

REFERENCE SIGNS LIST

1 . . . Rental vehicle system, 10 . . . CPU, 11 . . . Rental management unit, 12 . . . Usage scheduled period recognition unit, 13 . . . Owned vehicle identification information recognition unit, 14 . . . Rental vehicle identification information recognition unit, 15 . . . Parked vehicle identification information recognition unit, 16 . . . Parked vehicle identification unit, 17 . . . Wrong parking handling unit, 18 . . . Rental vehicle location recognition unit, 19 . . . Substitute parking space guiding unit, 20 . . . Exiting vehicle identification information recognition unit, 21 . . . Parking fee setting unit, 40 . . . Memory, 41 . . . Program for control, 42 . . . User DB, 43 . . . Rental vehicle DB, 60 . . . Gate management apparatus, 70 . . . Parking space monitoring apparatus, 90 . . . Owned vehicle, 100, 110 . . . Rental vehicle, 400 . . . Parking lot management server

What is claimed is:

1. A vehicle rental system, comprising:
a first processor that:
recognizes a usage scheduled period of a rental vehicle;
recognizes owned vehicle identification information for identifying an owned vehicle of a user of the rental vehicle in the usage scheduled period;
recognizes rental vehicle identification information for identifying the rental vehicle;
recognizes parked vehicle identification information for identifying a parked vehicle in a standby parking space that is a parking space during rental standby for the rental vehicle;
determines whether the parked vehicle in the standby parking space is the rental vehicle or the owned vehicle on the basis of the parked vehicle identification information, the rental vehicle identification information, and the owned vehicle identification information;
and executes wrong parking handling processing for removing the parked vehicle in the standby parking space when the processor determines that the parked vehicle in the standby parking space is not the rental vehicle or the owned vehicle within the usage scheduled period;
and a parking space monitoring apparatus that is arranged in the standby parking space so that the standby parking space can be monitored, wherein the parking space monitoring apparatus comprises:
a second processor;
a camera that photographs the standby parking space;
a receiver and a transmitter that transmits a photographed image obtained by the camera;
and a movement sensor that outputs a signal indicating that the parking space monitoring apparatus is moved away from a predetermined arrangement position of the parking space monitoring apparatus,
the predetermined arrangement position of the parking space monitoring apparatus is where the parked vehicle in the standby parking space can be photographed,
the parking space monitoring apparatus is moveably arranged in the standby parking space,
the first processor obtains the photograph image,
of the standby parking space,
that is transmitted from the transmitter of the parking space
monitoring apparatus as the parked vehicle information,
the second processor of the parking space monitoring apparatus transmits, through the transmitter,
information indicating a movement of the parking space monitoring apparatus is detected to the first processor when the second processor detects the parking space monitoring apparatus is moved away from the predetermined arrangement position for more than a predetermined distance based on an output from the movement sensor.

2. The vehicle rental system according to claim 1, wherein the-first processor:
recognizes a current location of the rental vehicle;
and transmits information on an empty parking space other than the standby parking space to a user terminal used by the user when the processor determines that the parked vehicle in the standby parking space is not the owned vehicle when returning of the rental vehicle to the standby parking space is estimated in advance on the basis of the current location of the rental vehicle recognized by the processor.

3. The vehicle rental system according to claim 1, wherein the first processor executes the wrong parking handling processing when the first processor determines that the parked vehicle in the standby parking space is the owned vehicle after the usage scheduled period elapses.

4. A vehicle rental system, comprising:
a first processor that:
recognizes a usage scheduled period of a rental vehicle;
recognizes owned vehicle identification information for identifying an owned vehicle of a user of the rental vehicle in the usage scheduled period;
recognizes rental vehicle identification information for identifying the rental vehicle;
recognizes parked vehicle identification information for identifying a parked vehicle in a standby parking space that is a parking space during rental standby for the rental vehicle;
determines whether the parked vehicle in the standby parking space is the rental vehicle or the owned vehicle on the basis of the parked vehicle identification information, the rental vehicle identification information, and the owned vehicle identification information;
and executes wrong parking handling processing for removing the parked vehicle in the standby parking space when the first processor determines that the parked vehicle in the standby parking space is not the rental vehicle or the owned vehicle within the usage scheduled period;

and a parking space monitoring apparatus comprising a second processor, a camera, a receiver, a transmitter, and a movement sensor, wherein the parking space monitoring apparatus is arranged in the standby parking space so that the standby parking space can be monitored, wherein a predetermined arrangement position of the parking space monitoring apparatus is where the parked vehicle in the standby parking space can be photographed, the parking space monitoring apparatus is moveably arranged in the standby parking space, the standby parking space is arranged to be placed side by side with a pay parking space in a parking lot, the first processor:
  recognizes an exiting vehicle identification information for identifying an exiting vehicle that arrives at an exit of the parking lot;
  and determines, when the first processor recognizes the exiting vehicle identification information for a predetermined exiting vehicle that reaches the exit within the usage scheduled period, whether the predetermined exiting vehicle is the owned vehicle on the basis of the owned vehicle identification information and reduces a charge of usage fee of the parking lot for the user when the predetermined exiting vehicle is determined as the owned vehicle and the parked vehicle that was parked in the standby parking space within the usage scheduled period; and the parking space monitoring apparatus:
  detects, via the movement sensor, that the parking space monitoring apparatus has moved away from a predetermined arrangement position of the parking space monitoring apparatus; and
  transmits, through the transmitter, information indicating a movement of the parking space monitoring apparatus is detected to the first processor when the second processor detects the parking space monitoring apparatus is moved away from the predetermined arrangement position for more than a predetermined distance based on an output from the movement sensor.

5. A vehicle rental method executed by a computer system, the vehicle rental method comprising:
  recognizing, via a first processor, a usage scheduled period of a rental vehicle;
  recognizing owned vehicle identification information for identifying an owned vehicle of a user of the rental vehicle in the usage scheduled period;
  recognizing rental vehicle identification information for identifying the rental vehicle;
  recognizing parked vehicle identification information for identifying a parked vehicle in a standby parking space that is a parking space during rental standby for the rental vehicle;
  determining whether the parked vehicle in the standby parking space is the rental vehicle or the owned vehicle on the basis of the parked vehicle identification information, the rental vehicle identification information, and the owned vehicle identification information;
  executing wrong parking handling processing for removing the parked vehicle in the standby parking space when it is determined that the parked vehicle in the standby parking space is not the rental vehicle or the owned vehicle within the usage scheduled period;
  obtaining a photograph image, of the standby parking space, that is transmitted from a parking space monitoring apparatus as the parked vehicle identification information, the parking space monitoring apparatus being arranged in the standby parking space so that the standby parking space can be monitored and the parked vehicle in the standby parking space can be photographed;
  detecting, via a second processor arranged in the parking space monitoring apparatus, when the parking space monitoring apparatus is moved away from a predetermined arrangement position for more than a predetermined distance based on an output from a movement sensor of the parking space monitoring apparatus; and
  transmitting, from a transmitter arranged in the parking space monitoring apparatus, information indicating a movement of the parking space monitoring apparatus is detected to the first processor when the second processor detects the parking space monitoring apparatus is moved away from the predetermined arrangement position for more than a predetermined distance based on an output from the movement sensor.

* * * * *